(12) United States Patent
Now et al.

(10) Patent No.: US 12,327,037 B2
(45) Date of Patent: *Jun. 10, 2025

(54) QUICK FACTORY RESET APPLICATION

(71) Applicants: Leo Now, South San Francisco, CA (US); Craig Dong, Clayton, CA (US)

(72) Inventors: Leo Now, South San Francisco, CA (US); Craig Dong, Clayton, CA (US)

(*) Notice: Subject to any disclaimer, the term of this patent is extended or adjusted under 35 U.S.C. 154(b) by 212 days.

This patent is subject to a terminal disclaimer.

(21) Appl. No.: 18/110,169

(22) Filed: Feb. 15, 2023

(65) Prior Publication Data

US 2023/0401000 A1    Dec. 14, 2023

Related U.S. Application Data

(63) Continuation-in-part of application No. 17/361,069, filed on Jun. 28, 2021, now Pat. No. 11,609,619.

(51) Int. Cl.
*G06F 1/24* (2006.01)
*G06F 3/06* (2006.01)

(52) U.S. Cl.
CPC .......... *G06F 3/0652* (2013.01); *G06F 3/0623* (2013.01); *G06F 3/0673* (2013.01)

(58) Field of Classification Search
CPC .... G06F 3/0623; G06F 3/0652; G06F 3/0673; G06F 1/24; G06F 21/6245; G06F 21/88; G06F 2221/2143
USPC .......................................................... 713/1
See application file for complete search history.

(56) References Cited

U.S. PATENT DOCUMENTS

| | | | |
|---|---|---|---|
| 8,248,237 B2 * | 8/2012 | Fitzgerald | H04W 12/126 340/5.31 |
| 11,609,619 B1 | 3/2023 | Now et al. | |
| 2009/0031122 A1 * | 1/2009 | Hodzic | G06F 1/24 713/1 |
| 2017/0168533 A1 * | 6/2017 | Rhoads | G06F 9/4406 |
| 2021/0157956 A1 | 5/2021 | Valusamy et al. | |

FOREIGN PATENT DOCUMENTS

WO    WO-2016072833 A1 *    5/2016    .......... G06F 11/1441

* cited by examiner

*Primary Examiner* — Chun Cao
(74) *Attorney, Agent, or Firm* — QuickPatents; Kevin Prince

(57) ABSTRACT

A processor-enabled method of deleting data of a user on one or more electronic devices of the type having a processor, a volatile memory, a non-volatile memory, a display, and a user interface, includes the steps of A) providing a software application resident in the non-volatile memory of the electronic device, B) running the software application so that the software application is in a standby mode, C) checking a remote reset flag, and D) in an emergency situation, the user using the user interface to activate a data destruction routine of the software application, or the remote reset flag initiating the data destruction routine. The data destruction routine performs the steps: 1) setting the remote reset flag, 2) turning off the display of the electronic device, 3) overwriting the data of the user in the non-volatile memory with decoy data, and 4) initiating the factory-reset module.

17 Claims, 2 Drawing Sheets

QUICK FACTORY RESET APPLICATION

CROSS-REFERENCE TO RELATED APPLICATIONS

This application is a Continuation-in-Part of U.S. patent application Ser. No. 17/361,069, filed on Jun. 28, 2021, and is incorporated herein by reference.

STATEMENT REGARDING FEDERALLY SPONSORED RESEARCH AND DEVELOPMENT

Not Applicable.

FIELD OF THE INVENTION

This invention relates to data protection, and more particularly to an application for quickly resetting portable electronic devices to a factory reset condition, and for performing an emergency erase of data on other devices.

BACKGROUND

Electronic devices such as smart phones, tablet computers, and laptop computers are convenient tools for conducting business and personal affairs alike. However, such electronic devices can also prove to be a liability in situations where the personal data on such electronic devices is obtained by those with malicious intent. For example, personal financial records or business secrets may be stored on such devices.

Therefore, there is a need for a method of protecting such personal data if it appears to a user of such an electronic device that the electronic device will be falling into the wrong hands. Such a needed method would be easy to activate, and once activated would not be easily halted. Such a needed invention would provide for discrete activation, but would be difficult to activate inadvertently. Such a needed method would provide for an emergency erasing of data on remote devices as well. The present invention accomplishes these objectives.

SUMMARY OF THE INVENTION

The present invention is a processor-enabled method of deleting data of a user on an electronic device or electronic devices that each comprises a processor, a volatile memory, a non-volatile memory, a display, a wireless networking module, and a user interface. Such an electronic device, such as a smart phone, tablet computer, laptop computer, or the like, further preferably includes a factory reset module in the non-volatile memory. The non-volatile memory may include a SIM card of the electronic device, such as with a so-called smart phone.

The method comprises the steps:
a) providing a software application resident in the non-volatile memory of the electronic device;
b) activating the software application so that the software application is running in the volatile memory of the electronic device;
c) providing access to a cloud memory through the wireless networking module of the electronic device;
d1) check the non-volatile memory for a reset flag and, if set, starting a data destruction routine;
d2) check a predetermined network location for a remote reset flag and, if set, start the data destruction routine;
e) using the user interface to activate the data destruction routine of the software application that includes the steps:
ia) setting the reset flat in the non-volatile memory;
ib) setting the remote reset flag at the predetermined network location;
ii) turning off the display and locking the user interface;
iii) overwriting user information in the non-volatile memory with decoy data;
iv) overwriting user information in the cloud memory with the decoy data; and
iv) initiating a factory reset module of the electronic device.

As in our previous utility patent application, in some embodiments, the user interface may include mechanical buttons on the electronic device. In alternate embodiments the user interface may include one or more so-called "soft buttons," which may be displayed on a lock screen of the electronic device, the display in such an embodiment having a touch-screen interface. The user in such embodiments may have to activate all of the mechanical buttons simultaneously, such as the volume up, volume down, and power buttons, for example, for a preset period of time such as three seconds, for example, or all of the software buttons displayed on the lock screen of the electronic device, or some combination thereof, in order to activate the data destruction routine. Requiring the user to actuate multiple of the user interface buttons, reduces the change of inadvertent activation of the data destruction routine. In some embodiments the display is blank while the data destruction routine is operating.

The predetermined network location may be a network location of a service reachable through the network, such as the internet or a mobile phone network for example, by the electronic device and other devices attached to a user's account. As such, any electronic device attached to the user's account, when checking the predetermined network location for the remote reset flag, can initiate its own data destruction routine when verifying that the remote reset flag is set.

Further, the cloud memory may be included in the user's account that is also overwritten with the decoy data by any of the user's electronic devices when the remote reset flag or the reset flag is set. Such decoy data may be all zeros, or all ones, or random data, for example.

One such electronic device may be a wearable electronic device, such as a so-called smart watch that comprises a processor, a volatile memory, a non-volatile memory, a display, a wireless networking module, and a user interface. A software application, similar to the software application, resides in the non-volatile memory of the wearable electronic device and once activated so as to run in the volatile memory, its user interface may be used to activate a data destruction routine that simply sets the remote reset flag at the predetermined network location.

In use, if the user determines that one of his electronic devices, such as his laptop computer, has been taken by someone with malicious intent, the user can either activate the software application on his electronic device, such as his smart phone, and initiate the data destruction routine, or the user can initiate the data destruction routine by selecting the appropriate combination of mechanical buttons or software buttons, such as on the lock screen of the smart phone. If the user only has his smart watch wearable electronic device, the user can initiate the data destruction routine by activating the user interface on the software application running on the wearable electronic device, which will cause other electronic devices on the user's account to begin their data destruction routines upon being powered up and connected with the network.

The present invention is a method of protecting such personal data if it appears to a user of an electronic device that the electronic device may be confiscated by one or more bad actors with malicious intent. The present method is easy to activate, and once activated is not easily stopped. The present invention provides for discrete activation, but is also difficult to activate inadvertently. The present method further provides for emergency erasing of data on remote devices as well. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
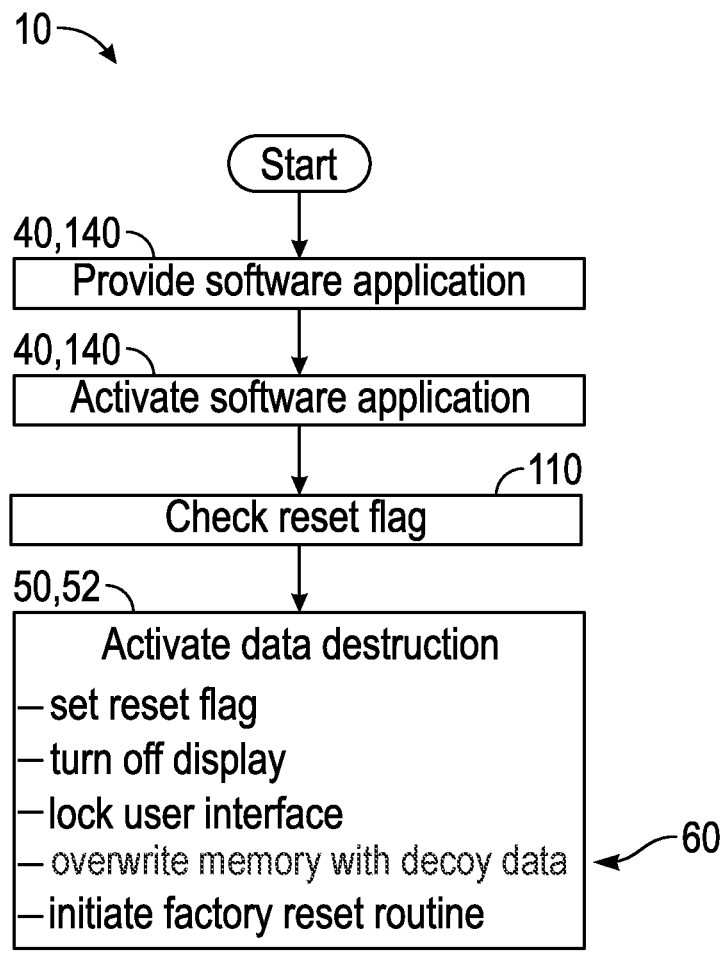
FIG. 1 is a flow chart of a method of the present invention.
Figure 2:
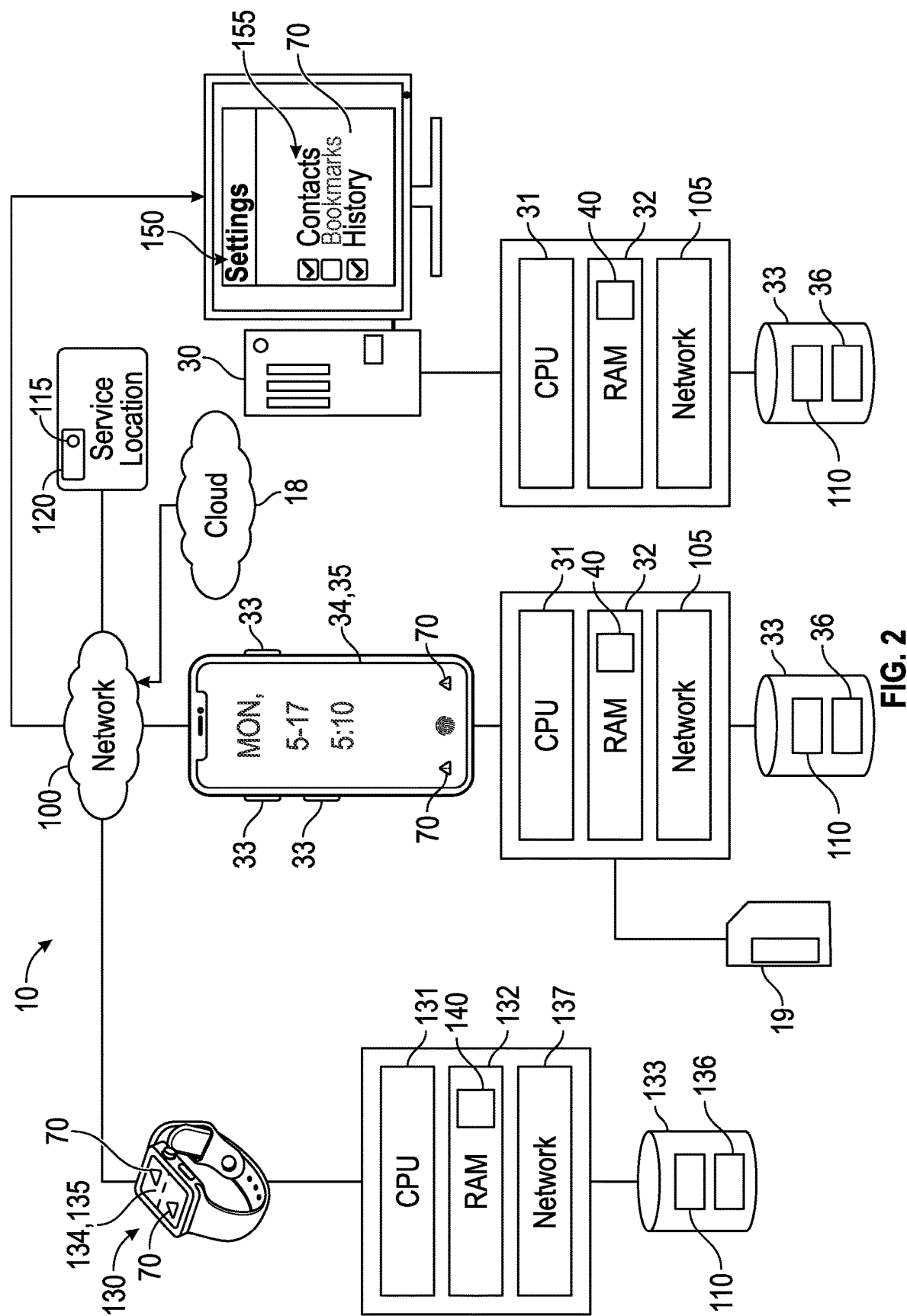
FIG. 2 is a system diagram of the present invention.

FIGS. 1 and 2 illustrate a processor-enabled method 10 of deleting data 15 of a user 20 on one or more electronic devices 30 that each comprise a processor 31, a volatile memory 32, a non-volatile memory 33, a display 34, a wireless networking module 105, and a user interface 35. Such an electronic device 30, such as a smart phone, tablet computer, laptop computer, or the like, further may include a factory reset module 36 in the non-volatile memory 33. The non-volatile memory 33 may include a SIM card 19 (FIG. 2) of the electronic device 30.

The method 10 comprises the steps:
a) providing a software application 40 resident in the non-volatile memory 33 of the electronic device 30;
b) activating the software application 40 so that the software application 40 is running in the volatile memory 32 of the electronic device 30;
c) providing access to a cloud memory 18 through the wireless networking module 105 of the electronic device;
d1) check the non-volatile memory 33 for a reset flag 110 and, if set, starting a data destruction routine 50;
d2) check a predetermined network location 120 for a remote reset flag 115 and, if set, start the data destruction routine 50;
e) using the user interface 35 to activate the data destruction routine 50 of the software application 40 that includes the steps:
ia) setting the reset flat 110 in the non-volatile memory 33;
ib) setting the remote reset flag 115 at the predetermined network location 120;
ii) turning off the display 34 and locking the user interface 35;
iii) overwriting user information in the non-volatile memory 33 with decoy data 60;
iv) overwriting user information in the cloud memory 18 with the decoy data 60; and
iv) initiating a factory reset module 36 of the electronic device 30.

As in our previous utility patent application, in some embodiments, the user interface 35 may include mechanical buttons 35 on the electronic device 30 (FIG. 2). In alternate embodiments the user interface 35 may include one or more so-called "soft buttons" 70 (FIG. 2), which may be displayed on a lock screen 37 of the electronic device 30, the display 34 in such an embodiment having a touch-screen interface. The user 20 in such embodiments may have to activate all of the mechanical buttons 35 simultaneously, such as the volume up, volume down, and power buttons, for example, for a preset period of time such as three seconds, for example, or all of the software buttons 70 displayed on the lock screen 37 of the electronic device 30, or some combination thereof, in order to activate the data destruction routine 50. Requiring the user 20 to actuate multiple of the user interface buttons 35,75 reduces the change of inadvertent activation of the data destruction routine 50. In some embodiments the display 34 is blank while the data destruction routine 50 is operating.

The predetermined network location 120 may be a network location of the service (FIG. 2) reachable through the network 100 by the electronic device 30 and other devices attached to the user's account. The network 100 may be the internet or a mobile phone network, for example. As such, any electronic device 30 attached to a user's account, when checking the predetermined network location 120 for the remote reset flag 115, can initiate its own data destruction routine 50 when verifying that the remote reset flag 115 is set. In this way initiating the data destruction routine 50 on one electronic device 30 will cause any other electronic device on the user's account to initiate its own data destruction routine 50.

Further, the cloud memory 18 may be included in the user's account that is also overwritten with the decoy data 60 by any of the user's electronic devices 30 when the remote reset flag 115 or the reset flag 110 is set. Such decoy data 60 may be all zeros, or all ones, or random data, for example. One such electronic device 30 may be a wearable electronic device 130, such as a so-called smart watch 130 (FIG. 2) that comprises a processor 131, a volatile memory 132, a non-volatile memory 133, a display 134, a wireless networking module 137, and a user interface 135. A software application 140, similar to the software application 40, resides in the non-volatile memory 133 of the wearable electronic device 130 and, once activated so as to run in the volatile memory 132, its user interface 135 may be used to activate a data destruction routine 52 that simply sets the remote reset flag 115 at the predetermined network location 120. Such a wearable electronic device 130 likely has little proprietary data stored within the volatile memory 132 or the non-volatile memory 133, so the data destruction routine 52 merely has to set the remote reset flag 115 and the data destruction routines 50 running on the electronic devices 30 will overwrite their own local user information with the decoy data 60 when their software applications 40 check for the remote reset flag 115 being set.

In a settings function 150 of the software application 40, the application 40 may ask the user 20 to select preservable portions 155 of the non-volatile memory 33, volatile memory 32, and cloud memory 18. Such preservable portions 155 are kept intact in the event that the data destruction routine 50 is activated. Such preservable portions 155 may include information for the user's contacts, bookmarks, browsing history, accounting files, or other data 15 that the user 20 desires to preserve, even in an emergency when the data destruction routine 50 is activated. Further, the application 40 may provide the user 20 the option of the application 40 executing at each startup of the electronic device 30, or if the application 40 is stopped, so that it is always running at least in the background.

In use, if the user 20 determines that one of his electronic devices 30, such as his laptop computer, has been taken by someone with malicious intent, the user 20 can either activate the software application 40 on his electronic device 30, such as his smart phone, and initiate the data destruction routine 50. Alternately, the user 20 can initiate the data destruction routine 50 by selecting the appropriate combination of mechanical buttons 35 or software buttons 70, such as on the lock screen 37 of the smart phone. If the user 20 only has his smart watch wearable electronic device 130, the user 20 can initiate the data destruction routine 52 by activating the user interface 135 on the software application 140 running on the wearable electronic device 130, which will cause other electronic devices 30 on the user's account to begin their data destruction routines 50 upon being powered up and connected with the network 110. Even if the data destruction routine 50 is run on all of the user's electronic devices, the preservable portions 155 previously selected by the user 20 will be preserved and not overwritten with the decoy data 60. In some embodiments, a "destroy all" command may be issued on the user interface 35 of the electronic device 30, or on the user interface 135 of the wearable electronic device 130, to overwrite even the preservable portions 155 with the decoy data 60.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A processor-enabled method of deleting data of a user on an electronic device that comprises a processor, a volatile memory, a non-volatile memory, a display, a wireless networking module, and a user interface, and that includes a factory reset module in the non-volatile memory, the method comprising the steps:
   providing a software application resident in the non-volatile memory of the electronic device;
   activating the software application so that the software application is running in the volatile memory of the electronic device;
   checking the non-volatile memory for a reset flag and, if set, starting a data destruction routine;
   using the user interface to activate the data destruction routine of the software application, the data destruction routine including the steps:
      setting the reset flag in the non-volatile memory;
      turning off the display and locking the user interface;
      overwriting user information in the non-volatile memory with decoy data; and
      initiating the factory reset module of the electronic device; wherein
   the smart electronic device displaying and the user interface including a software button for activating the data destruction routine, the smart electronic device when three or more mechanical buttons of the smart electronic device are depressed simultaneously displaying the user interface that includes the software button for activating the data destruction routine.

2. The processor-enabled method of claim 1 further including the step:
checking a predetermined network location for a remote reset flag and, if set, start the data destruction routine; and wherein the data destruction routine includes the following step:
setting the remote reset flag at the predetermined network location.

3. The processor-enabled method of claim 1 wherein the data destruction routine includes the following step:
providing access to a cloud memory through the wireless networking module of the electronic device; and
overwriting user information in the cloud memory with decoy data.

4. The processor-enabled method of claim 2 further including the steps:
providing a wearable electronic device that comprises a processor, a volatile memory, a non-volatile memory, a display, a wireless networking module, and a user interface;
providing a software application resident in the non-volatile memory of the wearable electronic device;
activating the software application so that the software application is running in the volatile memory of the wearable electronic device;
using the user interface to activate a data destruction routine of the software application, the data destruction routine including the step:
setting the remote reset flag at the predetermined network location.

5. The processor-enabled method of claim 1 wherein at least a portion of the non-volatile memory is a SIM card of the electronic device.

6. The processor-enabled method of claim 3 further including the step:
in a settings function of the software application, asking the user to select preservable portions of the non-volatile memory, volatile memory, and cloud memory to keep in the event that the data destruction routine is activated;
and wherein the data destruction routine includes the following step:
overwriting user information in the non-volatile memory with decoy data except in those preservable portions of the non-volatile memory selected in the settings function of the software application.

7. The processor-enabled method of claim 1 wherein the decoy data is all zeros.

8. The processor-enabled method of claim 1 wherein the decoy data is all ones.

9. The processor-enabled method of claim 1 wherein the decoy data is random.

10. A non-transitory computer-readable storage medium in an electronic device storing a set of instructions that, when executed by a processor of the device, cause the processor to perform operations comprising the steps:
receiving from a user interface a command to activate a data destruction routine, the data destruction routine including the steps:
turning off a display and locking the user interface;
overwriting information in a non-volatile memory with decoy data; and
initiating a factory reset module of the electronic device; wherein
the smart electronic device displays and the user interface includes a software button for activating the data destruction routine, the smart electronic device when three or more mechanical buttons of the smart electronic device are depressed simultaneously displaying the user interface that includes the software button for activating the data destruction routine.

11. The non-transitory computer-readable storage medium of claim 10 further including the step:
checking a predetermined network location for a remote reset flag and, if set, starting the data destruction routine;
and wherein the data destruction routine includes the following step:
setting the remote reset flag at the predetermined network location.

12. The non-transitory computer-readable storage medium of claim 10 wherein the data destruction routine further includes the step:
providing access to a cloud memory through the wireless networking module of the electronic device; and
overwriting user information in the cloud memory with the decoy data.

13. The non-transitory computer-readable storage medium of claim 10 wherein the data destruction routine including the step:
overwriting information in a SIM card of the electronic device.

14. The non-transitory computer-readable storage medium of claim 10 wherein the software application including the steps:
asking the user to select preservable portions of the non-volatile memory, volatile memory, and cloud memory to keep in the event that the data destruction routine is activated;
and wherein the data destruction routine includes the following step:
overwriting user information in the non-volatile memory with decoy data except in those preservable portions of the non-volatile memory selected in the settings function of the software application.

15. The non-transitory computer-readable storage medium of claim 10 wherein the decoy data is all zeros.

16. The non-transitory computer-readable storage medium of claim 10 wherein the decoy data is all ones.

17. The non-transitory computer-readable storage medium of claim 10 wherein the decoy data is random.

* * * * *